(12) United States Patent
Mirassou et al.

(10) Patent No.: US 10,215,591 B2
(45) Date of Patent: Feb. 26, 2019

(54) METHOD FOR ADAPTING A DETECTION THRESHOLD OF A CRANKSHAFT SENSOR FOR MOTOR VEHICLE

(71) Applicants: CONTINENTAL AUTOMOTIVE FRANCE, Toulouse (FR); CONTINENTAL AUTOMOTIVE GmbH, Hannover (DE)

(72) Inventors: David Mirassou, Toulouse (FR); Marie-Nathalie Larue, Corronsac (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 776 days.

(21) Appl. No.: 14/727,356

(22) Filed: Jun. 1, 2015

(65) Prior Publication Data

US 2015/0346004 A1    Dec. 3, 2015

(30) Foreign Application Priority Data

Jun. 3, 2014    (FR) ...................................... 1455013

(51) Int. Cl.
*G01D 5/14* (2006.01)
*G01P 3/44* (2006.01)
(Continued)

(52) U.S. Cl.
CPC .............. *G01D 5/145* (2013.01); *G01D 5/12* (2013.01); *G01D 5/2448* (2013.01);
(Continued)

(58) Field of Classification Search
CPC .......................... G01D 5/2448; G01D 18/002
See application file for complete search history.

(56) References Cited

U.S. PATENT DOCUMENTS

| 5,554,948 A | 9/1996 | Hansen et al. |
| 6,163,148 A | 12/2000 | Takada et al. |

(Continued)

FOREIGN PATENT DOCUMENTS

| CN | 1175926 | 3/1998 |
| CN | 1985177 | 6/2007 |

(Continued)

OTHER PUBLICATIONS

FR Search Report, dated Jan. 30, 2015, from corresponding FR application.

*Primary Examiner* — Michael J Dalbo
(74) *Attorney, Agent, or Firm* — Young & Thompson (57) ABSTRACT

Disclosed is a method for adapting a detection threshold ($S_1$) of a magnetic field sensor for a crankshaft of a motor vehicle equipped with the "stop & go" function, the sensor delivering a signal (B) of variations of magnetic field having two states, such as: State 1: when the crankshaft is rotating: the signal includes rising fronts and falling fronts, State 2: when the crankshaft is stopped: the signal has an aperiodic progressive drift ($\Delta T_{AR}$). The method includes for state 2 steps making it possible to estimate the variation ($\Delta_1$, $\Delta_2$, $\Delta_3$, $\Delta_4 \ldots \Delta_i$) of the value ($V_1$, $V_2 \ldots V_i$) of the signal (B) during the stopped phase of the crankshaft in order to adapt the detection threshold ($S_1$) to a new value ($S_4$) applicable for the detection of the first tooth upon restart of the engine (R).

9 Claims, 4 Drawing Sheets

(51) Int. Cl.
    *G01D 18/00*     (2006.01)
    *G01P 21/00*     (2006.01)
    *G01D 5/244*     (2006.01)
    *G01P 3/487*     (2006.01)
    *G01P 3/488*     (2006.01)
    *G01P 3/489*     (2006.01)
    *G01D 5/12*     (2006.01)

(52) U.S. Cl.
CPC .............. *G01D 18/002* (2013.01); *G01P 3/44* (2013.01); *G01P 3/488* (2013.01); *G01P 3/489* (2013.01); *G01P 21/00* (2013.01); *G01D 18/008* (2013.01); *G01P 3/487* (2013.01)

(56) References Cited

U.S. PATENT DOCUMENTS

| | | |
|---|---|---|
| 6,181,036 B1 | 1/2001 | Kazama et al. |
| 6,456,063 B1 | 9/2002 | Moreno et al. |
| 2006/0119348 A1* | 6/2006 | Blossfeld .............. F02D 41/009 324/166 |
| 2008/0010037 A1 | 1/2008 | Hashizume |
| 2012/0078564 A1* | 3/2012 | Goodwin ................ G01B 7/30 702/116 |
| 2013/0021293 A1* | 1/2013 | Nakai .................... G06F 1/1626 345/174 |
| 2014/0066124 A1 | 3/2014 | Novet |

FOREIGN PATENT DOCUMENTS

| | | |
|---|---|---|
| DE | 101 53 884 A1 | 7/2002 |
| JP | 2000-23423 | 1/2000 |

\* cited by examiner

METHOD FOR ADAPTING A DETECTION THRESHOLD OF A CRANKSHAFT SENSOR FOR MOTOR VEHICLE

FIELD OF THE INVENTION

The present invention relates to a method for adapting a detection threshold of a crankshaft sensor for motor vehicle. More particularly, the objective is to improve the precision of the electrical signal delivered by a sensor installed facing toward a sprocket wheel situated at the end of a crankshaft of an engine of a motor vehicle.

BACKGROUND OF THE INVENTION

The crankshaft sensors are used in a motor vehicle in order to determine the position of the crankshaft and the speed of rotation and the direction of rotation of the engine. Used in combination with camshaft sensors, they determine the position of the different cylinders in the combustion cycle of the engine (i.e. determine for each cylinder whether said cylinder is in an intake phase, compression phase, explosion phase, or exhaust phase) and make it possible to manage the operation of the engine to the best possible extent by optimal regulation of the spark timing or the moment of fuel injection.

These crankshaft sensors comprise a magnetic field generator (for example: a permanent magnet), a magnetic field detection means (Hall effect cell, magnetoresistive (MR) cell, giant magnetoresistive (GMR) cell, etc., for example) and an electronic circuit for processing the signal received by the magnetic field detection means. These sensors, referred to as active sensors, deliver a digital signal to a central computer for processing.

The magnetic field generator may also be a target, made of a magnetic material, having alternating south and north poles. In this case the sensor may or may not include a permanent magnet depending on the detection means used. Consequently, the south and north poles will equate to the teeth and troughs of a mechanical target.

Figure 1:
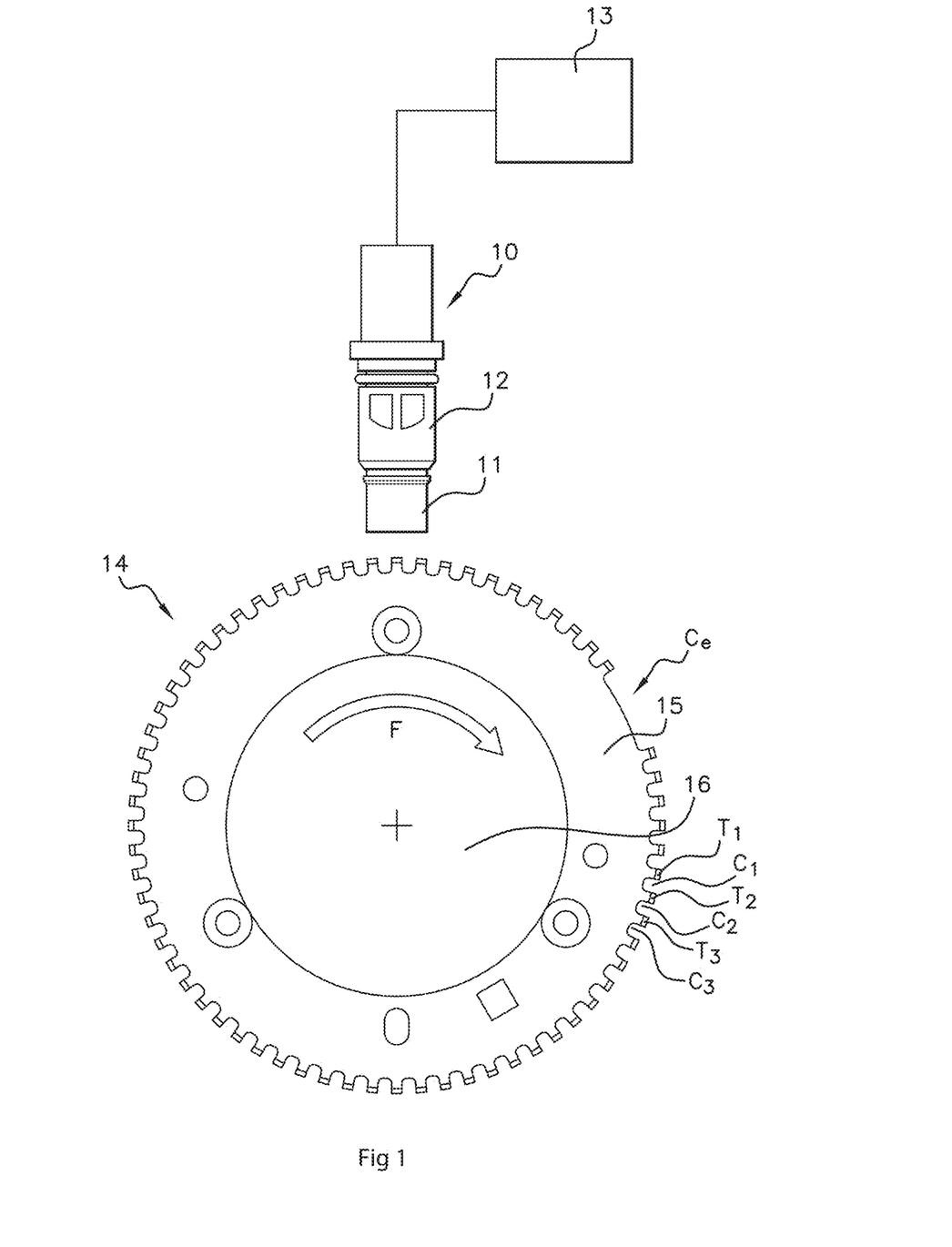

As illustrated in FIG. 1, a crankshaft sensor 10 is associated with a target 14 secured to a crankshaft 16. This target 14 is in the form of a disc 15 of which the periphery is toothed. A space (trough) $C_1$, $C_2$, $C_3$ is located between each tooth $T_1$, $T_2$, $T_3$, said teeth being substantially identical. The target is distinguished by the presence of a trough Ce of greater length, referred to more commonly as a "missing tooth" positioned precisely at a certain angle with respect to the angular position of the engine. In accordance with FIG. 1, a crankshaft sensor 10 comprises, as is known, a ferromagnetic element 11 and a magnetic field detection means 12 (for example a Hall effect sensor). This sensor 10 delivers a digital signal to one of the processing means 13.

The operation of such a sensor assembly 10 and of the associated target 14 is described hereinafter.

When the target 14 is driven in rotation (arrow F FIG. 1) by the crankshaft 16, the sensor 10 perceives a series of variations of the magnetic field representative of the tooth or teeth $T_1$, $T_2$, $T_3$ passing in front of said sensor and also representative of the spacing thereof $C_1$, $C_2$, $C_3$, $C_e$. This signal thus obtained is shown in FIG. 2.

Figure 2:
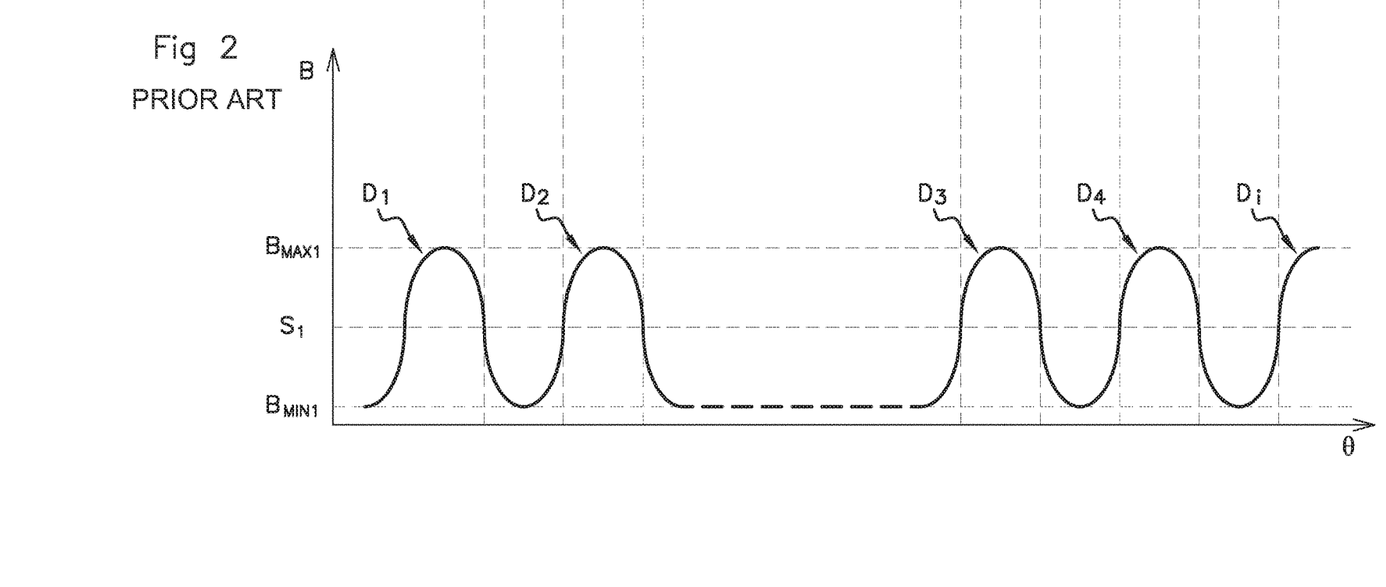
Figure 3:
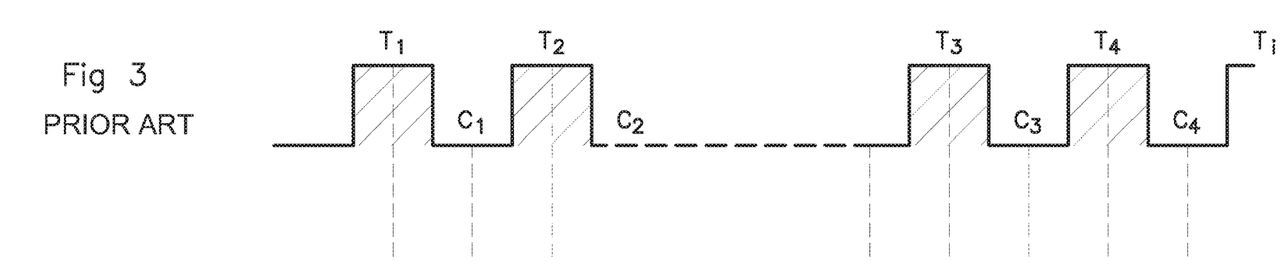

FIG. 2 shows, in accordance with the prior art, the signal B of the magnetic field delivered by the sensor 10 on the basis of the angle of rotation θ of the crankshaft 16, as well as the threshold $S_1$ for detection of the rising front and of the falling front of the first tooth $T_1$. FIG. 3 shows the position of the teeth $T_1$, $T_2$, ... $T_i$ and of the troughs $C_1$, $C_2$, ... $C_i$ of the target 14 with respect to the signal signal B of the magnetic field of FIG. 2.

As illustrated in FIG. 2, in order to determine the position of the crankshaft, the signal B representing the variations of the magnetic field perceived by the sensor 10 of the crankshaft 16 is observed during a revolution of the target 14, i.e. in accordance with an angle of rotation θ of the target 14. This signal has a series of sinusoids $D_1$, $D_2$ ... $D_i$ each corresponding to the variation of the magnetic field measured by the sensor 10 when a tooth $T_1$, $T_2$ ... $T_i$ (see FIG. 3) followed by a trough $C_1$, $C_2$ ... $C_i$ passes in front of said sensor 10. By counting the number of sinusoids $D_1$, $D_2$ ... $D_i$, by measuring the duration of each one thereof, the spacing between each sinusoid $D_1$, $D_2$ ... $D_i$, and by detecting the missing tooth (the spacing caused by the missing tooth Ce being longer), it is possible to determine the speed of rotation of the engine, the direction of rotation of the engine, and the angular position of the crankshaft.

As illustrated in FIG. 2, the signal B has a minimum $B_{MIN1}$ and a maximum $B_{MAX1}$. The passing of the teeth $T_1$, $T_2$ ... $T_i$ and of the troughs $C_1$, $C_2$ ... $C_i$ of the target 14 is detected by the detection of the passing of the signal B above (respectively below) a threshold detection $S_1$ placed between the minimum $B_{MIN1}$ and the maximum $B_{MAX1}$, for example equal to $S_1=k1*(B_{MAX1}-B_{MIN1})$, k1 being a constant, for example equal to 0.50.

For explanatory purposes, the signal B illustrated in FIG. 2 comprises a minimum threshold $B_{MIN1}$ and a maximum threshold $B_{MAX1}$. In reality the signal B has a plurality of minimums $B_{MINi}$ and a plurality of maximums $B_{MAXi}$ and the detection threshold $S_1$ adapts continuously on the basis of the minimums and maximums so as to always be equal to $S_1=k1*(B_{MAXi}-B_{MINi})$. This method for adapting the detection threshold $S_1$ is known to the person skilled in the art, see patent application FR 2 985 035 A1 filed by the applicant, which describes the same method for adapting the detection threshold, but applied to a camshaft sensor.

For the applications of the sensor 10 of the crankshaft 16 on vehicles equipped with the "stop & go" function, i.e. vehicles for which, when at standstill (at traffic lights for example), the engine is stopped temporarily, it is necessary when restarting the vehicle to precisely know the position of the crankshaft. The objective of this constraint is to observe the standards with regard to polluting emissions and to limit the fuel consumption.

When the engine is stopped the crankshaft 16, due to the inertia of said engine, performs a number of movements back and forth before stopping completely. The sensor 10 of the crankshaft 16 therefore is capable not only of increasing the number of teeth and troughs that it detects, but also of decreasing this number.

Figure 4:
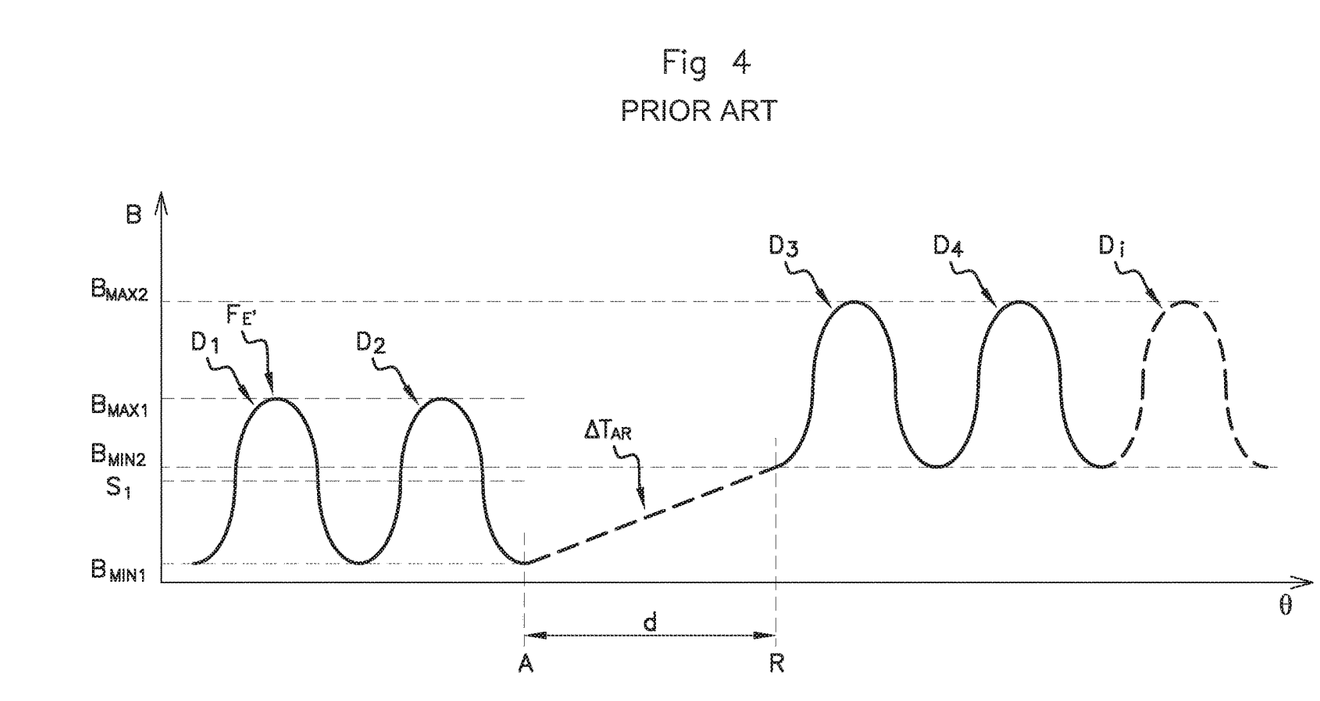

In addition, during the stopped phase of the engine d (see FIG. 4), which may last a number of minutes, the sensor 10 remains powered and the signal B has a progressive aperiodic drift, i.e. a slope comprising neither a rising front nor a falling front, referred to as thermal drift $\Delta T_{AR}$ (see FIG. 4). When the engine is restarted R, the value of the signal B is shifted and has a new minimum $B_{MIN2}$ and a new maximum $B_{MAX2}$. It is then necessary to adapt the detection threshold S1 on the basis of these new values $B_{MIN2}$ and $B_{MAX2}$ in order to detect, when the engine is restarted, the passing of the third and fourth teeth $T_3$, $T_4$ and of the third and fourth troughs $C_3$, $C_4$. If the detection threshold $S_1$ is not adapted to the new minimum $B_{MIN2}$ and maximum $B_{MAX2}$ values, and for example is below the minimum value $B_{MIN2}$ (as illustrated in FIG. 4), then no tooth (neither $T_3$, nor $T_4$) and no trough (neither $C_3$, nor $C_4$) can be detected during the restart, and the position of the crankshaft cannot be determined.

According to the prior art it is known during the development phase of the sensor 10 to determine an initialization detection threshold $S_{INIT}$. The initialization detection threshold $S_{INIT}$ is applied from the detection of the rising front and of the falling front of the first tooth $T_1$, during the starting of the engine from cold.

Again according to the prior art, once a maximum value $B_{MAX1}$ and a minimum value $B_{MIN1}$ of the magnetic field have been measured by the sensor 10, in other words once the first tooth $T_1$ has passed in front of the sensor 10, a use detection threshold $S_1'$ is then applied. The value of this is $S_1' = k_2*(B_{MAX1} - B_{MIN1})$, k2 being a constant between 0 and 1 (k2 can be equal to k1). This use detection threshold $S_1'$ is greater than the initialization detection threshold $S_{INIT}$ and is applied from the detection of the $2^{nd}$ tooth $T_2$ (rising front or falling front depending on the front that presents itself first).

For a sensor 10 of a crankshaft 16 forming part of a "stop & go" engine, it is known from the prior art, when restarting the engine from warm (detection of the passing of a first tooth), to apply the prior art method described above. In other words it is known to use an initialization detection threshold $S_{INIT}$, according to the example illustrated in FIG. 4, as the first tooth passes by after the restart, i.e. as the $3^{rd}$ tooth $T_3$ passes by. Then, after the passing of the third tooth $T_3$, it is known to calculate a utilization detection threshold equal to: $S_1' = k_2*(B_{MAX2} - B_{MIN2})$. This new detection threshold $S_1'$ is then applied (in the example illustrated in FIG. 4) with the passing of the $2^{nd}$ tooth after the restart from warm, this being the rising front of the $4^{th}$ tooth $T_4$ in the example illustrated in FIG. 4.

However, this method is not reliable when there are vibrations, or oscillations of the crankshaft in the event of restart from warm. These vibrations and these oscillations create extreme values of the signal B that correspond neither to the minimums nor to the maximums of the passing of the third and fourth teeth $T_3$, $T_4$ or of the third and fourth troughs $C_3$, $C_4$ in front of the target 14. This falsifies the calculation of the new threshold detection $S_1'$ and affects the precision of the determination of the position of the crankshaft 16.

SUMMARY OF THE INVENTION

By contrast with the starting of the vehicle from cold, for which a number of revolutions of the crankshaft 16 are allowed in order to precisely estimate the detection threshold $S_1$ and to precisely detect the passing of each tooth and of each trough in front of the sensor 10, in the case of the restart from warm, for reasons of compliance with antipollution and consumption reduction standards (quickest possible restart under optimal consumption and polluting emissions conditions), it is necessary to precisely know the position of the crankshaft 16 and therefore to estimate quickly and precisely the value of the new threshold detection $S_1'$, moreover from the first rising front of the third tooth $T_3$.

This is the objective of the present invention. The invention proposes a method for adapting a detection threshold of a crankshaft sensor of a motor vehicle improving the precision of said sensor when the engine is restarted from warm. The invention is applied more particularly to vehicles equipped with the "stop & go" function.

The invention proposes a method for adapting a detection threshold of a magnetic field sensor for a motor vehicle crankshaft, said vehicle comprising at least one crankshaft and a toothed target associated with said crankshaft, said sensor delivering a signal of variations of magnetic field having two states, such as:

State 1: when the crankshaft is rotating: the signal comprises rising fronts and falling fronts, representative of the teeth and troughs of the target, State 2: when the crankshaft is stopped: the signal has an aperiodic progressive drift.

The adaptation method comprises for state 1 a step of detection of the rising fronts and falling fronts of the signal on the basis of at least one detection threshold, and according to the invention said method comprises for state 2 the following steps:

step 1: detecting the stopping of the crankshaft by the absence during a predetermined period of detection of rising fronts and falling fronts over the signal on the basis of the detection threshold, step 2: after the predetermined period, measuring the value of the signal at successive intervals, step 3: for each interval, calculating the variation of the value of the signal over said interval, and step 4: calculating a new detection threshold by adding, to the detection threshold previously used over the previous interval, the variation of the value of the signal thus calculated over said previous interval, step 5: repeating steps 3 and 4 as long as there is no rising front or falling front detected on the basis of the antepenultimate detection threshold used prior to the addition in step 4.

The adaptation method according to the invention makes it possible, during a stopped phase of the engine (crankshaft stopped), during which the magnetic field sensor remains powered (i.e.: supplied with current), that is to say for state 2, to adapt the detection threshold to a new value taking into account the thermal drift sustained by the signal during said stopped phase of the engine.

Thus, the invention has the advantage, compared with the prior art, of using a new detection threshold adapted to the new extrema of the signal, when the engine is restarted. This new detection threshold is applicable from the first tooth encountered, whether a rising or falling front, which was not possible with the method of the prior art.

The adaptation method according to the invention thus enables an optimized restart of the engine in terms of fuel consumption and pollutant emission.

In accordance with a preferred embodiment the successive intervals are of identical duration.

The predetermined period is advantageously proportional to a speed of rotation of the crankshaft or the predetermined period is at least equal to a period comprising a rising front and a falling front prior to the stopping of the crankshaft.

The invention also relates to a device for measuring the position of the crankshaft of a motor vehicle engine, said device comprising:

a crankshaft, a toothed target associated with said crankshaft, a magnetic field sensor, arranged in the proximity of the toothed target, said sensor delivering a signal of variations of magnetic field caused by the rotation of the toothed target, such as:

when the crankshaft is rotating: the signal comprises rising fronts and falling fronts, representative of the teeth and troughs of the target, when the crankshaft is stopped: the signal has an aperiodic progressive drift, means for processing the signal delivered by the sensor.

In accordance with the invention said processing means are suitable for:
  detecting rising fronts and falling fronts of the signal on the basis of at least one detection threshold,
  detecting the stopping of the crankshaft by the absence during a predetermined period of detection of rising fronts and of falling fronts over the signal,
  after the predetermined period, measuring the value of the signal at successive intervals,
  for each interval, calculating the variation of the value of the signal,
  for each interval, calculating a new detection threshold by the addition, to the threshold detection previously used over the previous interval, of the variation of the value of the signal calculated over said previous interval,
  detecting the rotation of the crankshaft by using the antepenultimate calculated detection threshold.

The invention also applies to a magnetic field sensor for a motor vehicle crankshaft, said sensor being associated with processing means and delivering a signal of variations of magnetic field to said processing means, such as:
  when the crankshaft is rotating: the signal comprises rising fronts and falling fronts, representative of the teeth and the troughs of the target,
  when the crankshaft is stopped: the signal has an aperiodic progressive drift.

In accordance with the invention, the processing means are suitable for:
  detecting rising fronts and falling fronts of the signal on the basis of at least one detection threshold,
  detecting the stopping of the crankshaft by the absence during a predetermined period of detection of rising fronts and falling fronts over the signal,
  after the predetermined period, measuring the value of the signal at successive intervals,
  for each interval, calculating the variation of the value of the signal,
  for each interval, calculating a new detection threshold by the addition, to the detection threshold used previously over the previous interval, of the variation of the value of the signal calculated over said previous interval,
  detecting the rotation of the crankshaft by using the antepenultimate calculated detection threshold.

Lastly, the invention relates to any motor vehicle comprising a sensor according to the features listed above.

BRIEF DESCRIPTION OF THE DRAWINGS

Further features and advantages of the invention will become clear from the following description and from the examination of the accompanying drawings, in which:

FIG. 1, explained above, is a schematic sectional view, showing a sensor 10 of a crankshaft 16 and associated target 14 thereof, FIG. 2, explained above, shows in accordance with the prior art the signal B delivered by the sensor 10 on the basis of the angle of rotation of the crankshaft 16, and also the detection threshold $S_1$ of the rising and falling fronts, without thermal drift, FIG. 3, explained above, shows the position of the teeth $T_1, T_2 \ldots T_i$ and of the troughs $C_1, C_2 \ldots C_i$ of the target 14 with respect to the signal B delivered by the sensor 10 of FIG. 2, FIG. 4, explained above, shows the signal B delivered by the sensor 10 on the basis of the angle of rotation θ of the crankshaft 16, and also the detection threshold $S_1$ of the rising and falling fronts in the presence of a thermal drift $\Delta T_{AR}$, according to the prior art.

DETAILED DESCRIPTION OF THE INVENTION

The invention proposes a method for adapting the detection threshold $S_1$ of the rising fronts and of the falling fronts of the signal B delivered by the magnetic field sensor 10 associated with the crankshaft 16.

Said sensor 10, which forms part of a "stop & go" engine, delivers a signal B of variations of magnetic field having two states:
  State 1: when the crankshaft 16 is rotating (rotating engine), the signal B comprises rising fronts and falling fronts, representative of the teeth $T_1, T_2 \ldots T_i$ and of the troughs $C_1, C_2 \ldots C_i$ of the target 14 that pass in front of said sensor 10,
  State 2: when the crankshaft 16 is stopped (stopped engine, but sensor 10 is powered), the signal has an aperiodic progressive drift, which is a thermal drift $\Delta T_{AR}$, caused by the effect of the temperature prevailing in and around the sensor 10.

For state 1 the rising and falling fronts of the signal B are detected on the basis of at least one detection threshold $S_1$ in accordance with the prior art described above.

For state 2 the method according to the invention proposes, in a first step, detecting the stopping of the engine A by means of the magnetic field sensor 10. The magnetic field sensor 10 remains powered during this stopped phase of the engine d. The stopped state of the engine A is detected by the absence of detection by the sensor 10 of rising front and of falling front during a predetermined period $\Delta t_A$ (see FIG. 5). This predetermined period $\Delta t_A$ must be long enough, that is to say suitable, such that, under operating conditions of the engine (crankshaft 16 rotating), at least one rising front and at least one falling front of the signal B can be detected. This predetermined period $\Delta t_A$ can be equal to, for example, 1 second or can be proportional to the speed of rotation of the crankshaft 16.

Once the stopped state of the engine A has been detected, the sensor 10 continues to measure the value of the magnetic field that it receives and thus delivers a signal B to means for processing 13 the signal. The means for processing 13 the signal then measure the value of the signal B at successive intervals $\Delta t_1, \Delta t_2, \Delta t_a, \Delta t_4 \ldots \Delta t_i$ (see FIG. 5). These intervals $\Delta t_1, \Delta t_2, \Delta t_3, \Delta t_4, \Delta t_i$ can be regular, of equal duration, for example one second.

Figure 5:
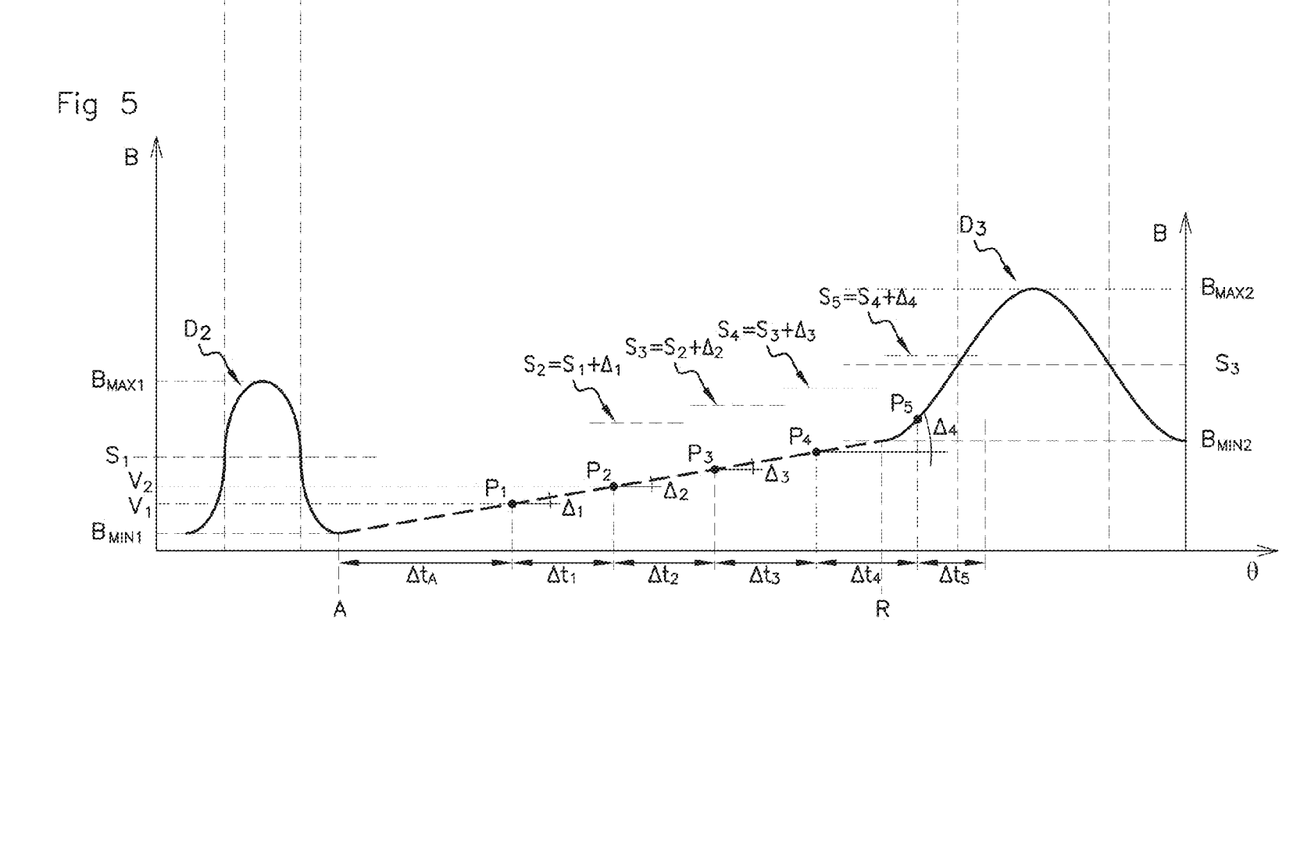
FIG. 5 shows the signal B delivered by the sensor 10 on the basis of the angle of rotation θ of the crankshaft 16, and also the adaptation of the detection threshold $S_1, S_2 \ldots$ of the rising and falling fronts, in the presence of a thermal drift $\Delta T_{AR}$, according to the invention.

For each interval $\Delta t_1, \Delta t_2, \Delta t_3, \Delta t_4, \ldots \Delta t_i$, the processing means 13 calculate the variation $\Delta_1, \Delta_2, \Delta_3, \Delta_4 \ldots \Delta_i$ of the value of the signal B between the start of the interval $\Delta t_i$ and the end of the interval $\Delta t_i$. This variation $\Delta_1, \Delta_2, \Delta_3, \Delta_4 \ldots \Delta_i$ of the value of the signal B corresponds to the thermal drift $\Delta T_{AR}$, caused by the effect of the temperature prevailing beneath the hood of the vehicle on the signal B delivered by the sensor 10.

Then, for each interval $\Delta t_i$, the detection threshold Si is equal to the sum between the detection threshold $S_{i-1}$ and the variation of the value $\Delta_{i-1}$ of the signal B of the previous interval $\Delta t_{i-1}$.

Thus, for the first repetition, as illustrated in FIG. 5, after the predetermined period $\Delta t_A$ of detection of the stopping of the engine A, the value of the signal B is measured at the first point P1, then the value of the signal is measured at the second point P2, i.e. at the start of the end of the first interval $\Delta t_1$.

The first variation of the value of the signal B, $\Delta_1 = V_2 - V_1$ is calculated, with:

$\Delta_1$: first variation of the value of the signal B (between the first point P1 and the second point P2),
$V_1$: value of the signal B at the first point P1,
$V_2$: value of the signal B at the second point P2.

Then a second detection threshold $S_2$, after the first interval $\Delta t_1$ is calculated and is equal to:

$$S_2 = S_1 + \Delta_1$$

with:

$\Delta_1$: first variation of the value of the signal B (between the first point P1 and the second point P2), and
$S_1$: the detection threshold used previously, i.e. prior to the stopping of the engine A and equal to, for example:

$$S_1 = k1 * (B_{MAX1} - B_{MIN1})$$

and:

k1: a constant between 0 and 1,
$B_{MAX1}$ and $B_{MIN1}$: the extrema of the signal, respectively the maximum and the minimum of the signal B, prior to the stopping of the engine A.

These calculations are then repeated for the second and third points P2 and P3, i.e. for the second interval $\Delta t_2$. The second variation of the signal B, $\Delta_2$ over the second interval $\Delta t_2$ is equal to:

$$\Delta_2 = V_3 - V_2$$

Also, a third detection threshold $S_3$ after the second interval $\Delta t_2$ is equal to:

$$S_3 = S_2 + \Delta_2$$

with:

$\Delta_2$: second variation of the value of the signal B between the second point P2 and the third point P3,
$V_2$: value of the signal B at the second point P2,
$V_3$: value of the signal at the third point P3.

In FIG. 5, at the fourth point P4, the fourth detection threshold $S_4$ is:

$$S_4 = S_3 + \Delta_3$$

with:

$$\Delta_3 = V_4 - V_3$$

$\Delta_3$: third variation of the value of the signal B between the third point P3 and the fourth point P4,
$V_3$: value of the signal B at the third point P3,
$V_4$: value of the signal at the fourth point P4.

Then at the fifth point P5 the fifth detection threshold $S_5$ is:

$$S_5 = S_4 + \Delta_4$$

with:

$$\Delta_4 = V_5 - V_4$$

$\Delta_4$: fourth variation of the value of the signal B between the fourth point P4 and the fifth point P5,
$V_4$: value of the signal B at the fourth point P4,
$V_5$: value of the signal at the fifth point P5.

These steps are repeated n times as long as no restart of the engine R is detected. Over the interval $\Delta t_n$ there is thus:

$$S_n = S_{n-1} + \Delta_{n-1}$$

$$\Delta_{n-1} = V_n - V_{n-1}$$

with:

$S_n$: detection threshold over the interval $\Delta t_n$,
$S_{n-1}$: detection threshold over the interval $\Delta t_{n-1}$,
$\Delta_{n-1}$: variation of the value over the interval $\Delta t_{n-1}$,
$V_n$: value of the signal at the point n,
$V_{n-1}$: value of the signal at the point n-1.

It should be noted that the threshold $S_n$ of the interval $\Delta t_n$ is still calculated on the basis of the threshold $S_{n-1}$ and the variation $\Delta_{n-1}$ of the value of the signal B, calculated over the previous interval $\Delta t_{n-1}$. In fact, the variation $\Delta_n$ of the value of the signal B over the interval $\Delta t_n$ cannot be calculated as long as the interval $\Delta t_n$ is not yet finished.

Figure 6:
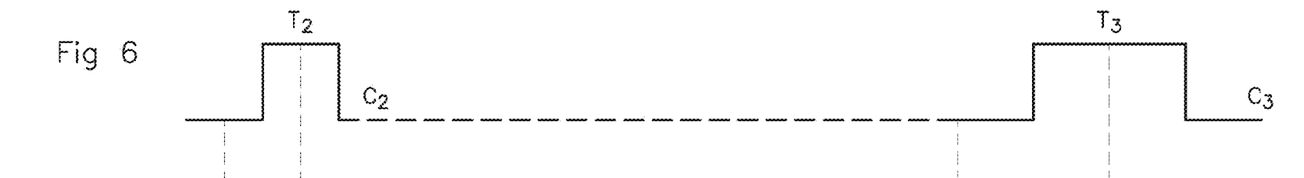
FIG. 6 shows the position of the teeth $T_2, T_3$ and of the troughs $C_2, C_3$ of the target 14 with respect to the signal B delivered by the sensor 10 of FIG. 5.

However, the exact moment of the restart of the engine R is unknown and may be located in any interval $\Delta t_1$, $\Delta t_2$, $\Delta t_3$, $\Delta t_4$ ... $\Delta t_i$. The restart of the engine R increases the values of the signal B following the passing of a tooth (in this case the $3^{rd}$ tooth $T_3$, as illustrated in FIG. 6) and falsifies (as has been explained further below) the calculation of the variation $\Delta_1$, $\Delta_2$, $\Delta_3$, $\Delta_4$ ... $\Delta_i$ of the value of the signal B over this interval. The detection threshold $S_1$, $S_2$, $S_3$, $S_4$ ... $S_i$ calculated over this interval $\Delta t_1$, $\Delta t_2$, $\Delta t_3$, $\Delta t_4$ ... $\Delta t_i$ is thus overestimated.

In FIG. 5 the restart of the engine R is at the end of the fourth interval $\Delta t_4$, causing a significant increase of the gradient of the signal B. The fourth variation $\Delta_4$ of the signal B is no longer representative solely of the thermal drift $\Delta T_{AR}$ since part of this variation is due to the restart of the engine R. The fourth detection threshold $S_4$ calculated over this fourth interval $\Delta t_4$ is thus overestimated.

During the detection of the rising front over the following interval, i.e. over the fifth interval $\Delta t_5$, the invention proposes not using the fourth detection threshold $S_4$ (calculated over the previous interval), since this is overestimated, but proposes using the third detection threshold $S_3$ calculated over the third interval $\Delta t_3$, i.e. to use the penultimate calculated threshold.

Of course, the third detection threshold $S_3$ does not include the rise of the signal B caused by the thermal drift $\Delta T_{AR}$ passing over the fourth interval $\Delta t_4$. The use of the third detection threshold $S_3$ thus underestimates the impact of the thermal drift $\Delta T_{AR}$.

However, since the gradient of the slope caused by the thermal drift is much lower than the gradient of the slope caused by the passing of a tooth, the invention sensibly proposes ignoring the thermal drift of the last interval so as not to overestimate the detection threshold caused by the passing of a tooth following the engine restart R.

The restart of the engine R is thus detected by the passing of the values of the signal B above the penultimate (antepenultimate) calculated detection threshold.

More precisely, over each interval $\Delta t_n$, the processing means 13 compare the value of the signal B with respect to the antepenultimate calculated detection threshold, i.e. with respect to the detection threshold $S_{n-2}$ calculated over the interval $\Delta t_{n-2}$.

It is important to note that the invention is based on the fact that the thermal drift $\Delta T_{AR}$ of the signal B during the stopped phase of the engine d is a slow physical phenomenon of less impact on the signal B than the variation of the magnetic field caused by the passing of teeth.

The adaptation method according to the invention is thus based on two hypotheses:
- the thermal drift of the signal B between the actual stopping of the engine A and the moment at which this stopping is detected (after the predetermined period $\Delta t_A$) is ignored, no variation of the signal B is calculated during the predetermined period, and
- the thermal drift of the signal B during the last interval, prior to the detection of the restart is also ignored. Thus, the detection threshold of the penultimate interval and not that of the last interval is used to detect the restart of the engine over the current interval.

The present invention has the advantage compared with the prior art of estimating the variation of the detection threshold caused by the thermal drift so that this can be used from the front of the first tooth after the restart.

Since after the first tooth detected after the engine restart (i.e. the third tooth $T_3$ in FIG. 6), the signal B being in state 1, the method for adapting the detection threshold $S_1$. ($S_1$. is not illustrated in FIG. 5 because it is applicable for the detection of the second tooth after the engine restart, which is not shown in FIG. 6) is identical to that of the prior art, the detection threshold adapts on the basis of the minimum $B_{MIN2}$ and the maximum $B_{MAX2}$ measured, so that:

$$S_{1'} = k1 * (B_{MAX1} - B_{MIN1})$$

The adaptation method according to the invention thus comprises, for state 2 of the signal B, the following steps:
- step 1: detection of the stopping of the crankshaft 16 by the absence during a predetermined period $\Delta t_A$ of detection of rising fronts and falling fronts over the signal B on the basis of the detection threshold $S_1$,
- step 2: after the predetermined period $\Delta t_A$, measuring the value $V_1, V_2 \ldots V_i$ of the signal B at successive intervals $\Delta t_1, \Delta t_2, \Delta t_3, \Delta t_4 \ldots \Delta t_i$,
- step 3: for each interval $\Delta t_1, \Delta t_2, \Delta t_3, \Delta t_4 \ldots \Delta t_i$, calculating the variation $\Delta_1, \Delta_2, \Delta_3, \Delta_4 \ldots \Delta_i$ of the value of the signal B over said interval $\Delta t_1, \Delta t_2, \Delta t_3, \Delta t_4 \ldots \Delta t_i$ and,
- step 4: calculating a new detection threshold $S_n$ by the addition, to the detection threshold used previously $S_{n-1}$ over the previous interval $\Delta t_{n-1}$, of the variation of the value of the signal $\Delta_{n-1}$ thus calculated over said previous interval $\Delta t_{n-1}$,
- step 5: repeating steps 3 and 4 as long as no rising front or falling front is detected on the basis of the antepenultimate detection threshold $S_{n-2}$ used prior to the addition of step 4.

In accordance with the invention the processing means 13 associated with the sensor 10 are suitable for:
- detecting rising fronts and falling fronts of the signal B on the basis of at least one detection threshold $S_1$,
- detecting the stopping of the crankshaft 16 by the absence during a predetermined period $\Delta t_A$ of detection of rising fronts and falling fronts over the signal B,
- after the predetermined period $\Delta t_A$, measuring the value $V_1, V_2 \ldots V_i$ of the signal at successive intervals $\Delta t_1, \Delta t_2, \Delta t_3, \Delta t_4 \ldots \Delta t_i$,
- for each interval $\Delta t_n$, calculating the variation $\Delta_n$ of the value of the signal B,
- for each interval $\Delta t_n$, calculating a new detection threshold $S_n$ by the addition, to the detection threshold previously used $S_{n-1}$ over the previous interval $\Delta t_{n-1}$, of the variation $\Delta_{n-1}$ of the value of the signal B calculated over said previous interval $\Delta t_{n-1}$,
- detecting the rotation of the crankshaft 16 by using the antepenultimate calculated detection threshold $S_{n-2}$.

The invention thus makes it possible to take into consideration the effect of the thermal drift sustained by the signal delivered by the sensor when the engine is stopped so as to adapt the detection threshold of the teeth and troughs of the target to a new value that makes it possible to detect, more precisely than the prior art methods, the first tooth from the restart of the engine.

The adaptation method according to the invention thus enables an engine restart from warm optimized in terms of fuel consumption and pollutant emission.

The invention claimed is:

1. A method for adapting a detection threshold of a magnetic field sensor for a crankshaft of an engine of a motor vehicle, the engine including a processor, the crankshaft including at least one toothed target, the magnetic field sensor being configured to deliver a signal of variations of magnetic field to the processor, the processor being configured to process the signal delivered by the sensor, the signal of variations of magnetic field delivered by said sensor having two States that include:
   State 1: when the crankshaft is rotating, the signal comprises rising fronts and falling fronts, representative of teeth and troughs of the target, and
   State 2: when the crankshaft is stopped, the signal has an aperiodic progressive drift,
   in order to account for a thermal drift sustained by the signal when the crankshaft is stopped to improve precision of the sensor when the engine is restarted from a warm condition, the adaptation method comprising:
   detecting, in the State 1, the rising fronts and falling fronts of the signal on the basis of at least one detection threshold; and
   in the State 2,
     step 1: detecting the stopping of the crankshaft by the absence during a predetermined period of detection of rising fronts and falling fronts over the signal based on the detection threshold,
     step 2: after the predetermined period, measuring the value of the signal at successive intervals,
     step 3: for each interval, calculating the variation of the value of the signal,
     step 4: calculating a new detection threshold by the addition, to the detection threshold previously used over the previous interval, of the variation of the value of the signal calculated over said previous interval, and
     step 5: repeating steps 3 and 4 as long as there is no rising front or falling front detected on the basis of the antepenultimate detection threshold used prior to the addition in step 4; and
   subsequently detecting, by the magnetic field sensor and the processor, a position of the crankshaft using the new calculated detection threshold after the engine is restarted from the warm condition after the crankshaft is stopped.

2. The adaptation method as claimed in claim 1, wherein the successive intervals are of identical duration.

3. The adaptation method as claimed in claim 2, wherein the predetermined period is proportional to a speed of rotation of the crankshaft.

4. The adaptation method as claimed in claim 2, wherein the predetermined period is at least equal to a period comprising a rising front and a falling front prior to the stopping of the crankshaft.

5. The adaptation method as claimed in claim 1, wherein the predetermined period is proportional to a speed of rotation of the crankshaft.

6. The adaptation method as claimed in claim 1, wherein the predetermined period is at least equal to a period comprising a rising front and a falling front prior to the stopping of the crankshaft.

7. A system for device for measuring the position of a crankshaft of a motor vehicle engine, said device comprising:
a crankshaft;
at least one toothed target associated with said crankshaft;
a magnetic field sensor, arranged in the proximity of the toothed target, said sensor delivering a signal of variations of magnetic field caused by the rotation of the toothed target:
when the crankshaft is rotating, the signal comprising rising fronts and falling fronts, representative of the teeth and troughs of the target, and
when the crankshaft is stopped, the signal having an aperiodic progressive drift; and
a processor configured to process the signal delivered by the sensor, the processor being configured to:
detect rising fronts and falling fronts of the signal on the basis of at least one detection threshold,
detect the stopping of the crankshaft by the absence during a predetermined period of detection of rising fronts and of falling fronts over the signal,
after the predetermined period, measure the value of the signal at successive intervals,
for each interval, calculate the variation of the value of the signal,
for each interval, calculate a new detection threshold by the addition, to the threshold detection previously used over the previous interval, of the variation of the value of the signal calculated over said previous interval,
detect the rotation of the crankshaft by using the antepenultimate calculated detection threshold,
subsequently detecting, by the magnetic field sensor and the processor, a position of the crankshaft using the new calculated detection threshold after the engine is restarted from a warm condition after the crankshaft is stopped.

8. A detection system comprising:
a processor; and
a magnetic field sensor for a motor vehicle crankshaft having at least one toothed target, said sensor being associated with the processor and configured to deliver a signal of variations of magnetic field to said processor, the magnetic field sensor being configured to:
when the crankshaft is rotating, provide the signal comprising rising fronts and falling fronts, representative of teeth and troughs of a target, and
when the crankshaft is stopped, provide the signal having an aperiodic progressive drift,
wherein the processor is configured to:
detect rising fronts and falling fronts of the signal on the basis of at least one detection threshold,
detect the stopping of the crankshaft by the absence, during a predetermined duration of detection of rising fronts and falling fronts, over the signal,
after the predetermined duration, measure the value of the signal at successive intervals,
for each interval, calculate the variation of the value of the signal,
for each interval, calculate a new detection threshold by the addition, to the detection threshold used previously over the previous interval, of the variation of the value of the signal calculated over said previous interval, and
detect the rotation of the crankshaft by using the antepenultimate calculated detection threshold,
wherein a position of the crankshaft is subsequently detected by the magnetic field sensor and the processor, using the new calculated detection threshold after the engine is restarted from a warm condition after the crankshaft is stopped.

9. A motor vehicle comprising a sensor as claimed in claim 8.

* * * * *